United States Patent Office 2,875,123
Patented Feb. 24, 1959

2,875,123

HEXACHLOROBICYCLOHEPTENE SULFONIC ACIDS AND DERIVATIVES AS INSECTICIDES

James C. Wygant, Dayton, Ohio, assignor to Monsanto Chemical Company, St. Louis, Mo., a corporation of Delaware No Drawing. Application March 7, 1957
Serial No. 644,448

9 Claims. (Cl. 167—30)

The present invention relates to organic sulfur compounds and more particularly provides a new and valuable chlorinated cycloalkenesulfonic acid compound and its acyl halide and amide, methods of preparing the same, and fungicidal compositions comprising the new amide.

According to the invention there are provided compounds of the formula

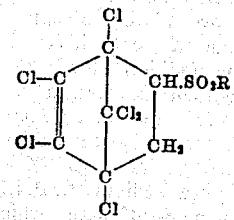

in which R is selected from the class consisting of halogen, $-NH_2$, $-OH$, and OM where M is alkali metal. Compounds having the above formula are 1,2,3,4,7,7-hexachlorobicyclo[2,2,1]-2-heptene-6-sulfonic acid; sodium, potassium or lithium 1,2,3,4,7,7-hexachlorobicyclo[2,2,1]-2-heptene-6-sulfonate, 1,2,3,4,7,7-hexachlorobicyclo[2,2,1]-2-heptene-6-sulfanyl chloride, bromide, iodide or fluoride, and 1,2,3,4,7,7-hexachlorobicyclo[2,2,1]-2-heptene-6-sulfonamide.

The above compounds may be prepared by a variety of procedures, but are most readily obtainable by first preparing the sulfonyl halide by the addition reaction of hexachlorocyclo-pentadiene with an ethylenesulfonyl halide according to the scheme:

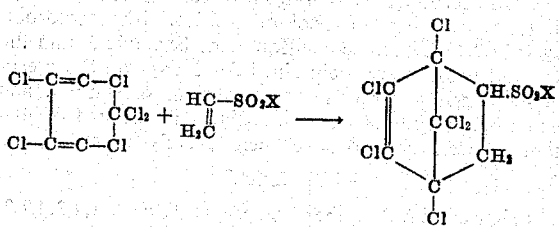

where X is halogen. Thus there is obtained 1,2,3,4,7,7-hexachlorobicyclo[2,2,1]-2-heptene-6-sulfonyl chloride, bromide, chloride, iodide or fluoride, depending upon the individual ethylenesulfonyl halide used, i. e., ethylenesulfonyl bromide, ethylenesulfonyl chloride, ethylenesulfonyl iodide, or ethylenesulfonyl fluoride.

The 1,2,3,4,7,7-hexachlorobicyclo[2,2,1]-2-heptene-6-sulfonyl halide thus obtained is readily hydrolyzed into the free sulfonic acid, i. e., 1,2,3,4,7,7-hexachlorobicyclo[2,2,1]-2-heptene-6-sulfonic acid. Upon treatment with an alkali metal carbonate said sulfonyl halide is converted to the alkali metal 1,2,3,4,7,7-hexachlorobicyclo[2,2,1]-2-heptene-6-sulfonate, thus:

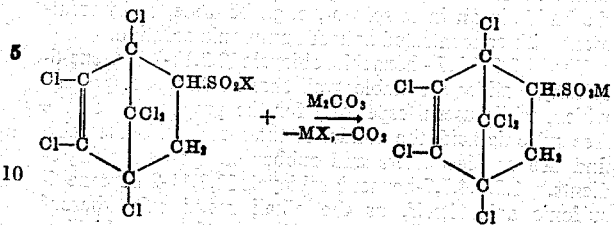

Upon treatment with ammonia, the 1,2,3,4,7,7-hexachlorobicyclo[2,2,1]-2-heptene-6-sulfonyl halides are readily converted into the amide, thus:

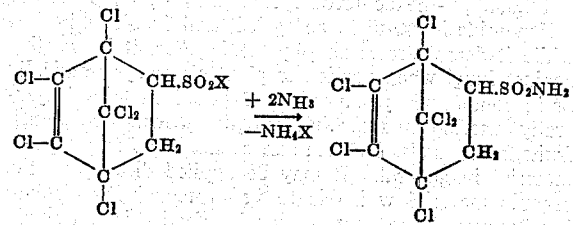

The 1,2,3,4,7,7-hexachlorobicyclo[2,2,1]-2-heptene-6-sulfonamide is also obtainable by the addition reaction of hexachlorocyclopentadiene with ethylenesulfonamide.

The 1:1 addition reaction of hexachlorocyclopentadiene with the ethylenesulfonyl halides to yield the 1,2,3,4,7,7-hexachlorobicyclo[2,2,1]-2-heptene-6-sulfonyl halides takes place readily by heating a mixture of the two reactants at a temperature of from, say, 70° C. to 170° C. until formation of the addition product has occurred. The reaction may be effected in the presence or absence of an inert diluent; when employing a diluent operation at the refluxing temperature of the diluted mixture is advantageously employed. A convenient means of maintaining a constant reaction temperature comprises use of a jacketed reaction vessel whereby the mixture of diene and ethylenesulfonyl halide is heated at the refluxing temperature of a liquid maintained in the outer jacket. When reaction is effected by employing equimolar quantities of the reactants and no diluent or solvent is employed, the reaction product consists essentially of the 1,2,3,4,7,7-hexachlorobicyclo[2,2,1]-2-heptene-6-sulfonyl halide. Any unreacted diene or ethylenesulfonyl halide that may be present in the product is separated by methods customarily known to the art, i. e., solvent extraction or distillation.

The 1:1 hexachlorocyclopentadiene-ethylenesulfonyl halide addition product is readily hydrolyzed by treatment with water, advantageously in the presence of a small quantity of mineral acid to give the 1,2,3,4,7,7-hexachlorobicyclo[2,2,1]-2-heptene-6-sulfonic acid. Upon heating said addition product, at say, a temperature of from 50° C. to 150° C., with a substantially equimolar proportion of an alkali metal carbonate, i. e., sodium, potassium or lithium carbonate, advantageously in the presence of a polar solvent, it is converted to the corresponding alkali metal 1,2,3,4,7,7-hexachlorobicyclo[2,2,1]-2-heptene-6-sulfonate. By-product alkali metal halide is removed from the sulfonate product by a difference in the solubility characteristics of the two salts. The sulfonate may also be obtained by primary hydrolysis of the 1:1 hexachloropentadiene-ethylenesulfonyl halide adduct to the free sulfonic acid and subsequent neutralization with alkali metal hydroxide to the alkali metal sulfonate.

Either the free sulfonic acid or the diene-ethylenesulfonyl addition product may be reacted with a hydroxy compound, e. g., ethanol, dodecanol or phenol to give the corresponding esters.

Conversion of the 1,2,3,4,7,7-hexachlorobicyclo[2,2,1]-2-heptene-6-sulfonyl halides to the sulfonamide is effected advantageously by treatment with liquid ammonia; however, the amidation may also be effected by passing gaseous ammonia into a substantially anhydrous solution of the halide in an inert solvent, e. g., benzene, or by treatment with concentrated aqueous ammonia solution.

The 1,2,3,4,7,7-hexachlorobicyclo[2,2,1]-2-heptene-6-sulfonyl halides are stable, well characterized compounds which, while useful especially for the preparation of the free sulfonic acid, the amide, or the metal sulfonates also find use as plasticizers and rubber compounding ingredients. 1,2,3,4,7,7-hexachlorobicyclo[2,2,1]-2-heptene-6-sulfonic acid, itself, or the alkali metal salts thereof possess phytotoxic properties and are useful as herbicides. Some of the heavy metal salts, particularly the copper and manganese salts, are fungicidal.

1,2,3,4,7,7-hexachlorobicyclo[2,2,1]-2-heptene-6-sulfonamide is useful as an agricultural fungicide in that while it demonstrates no phytotoxic effect it is effective against fungi when applied to plant either systematically or in contact sprays or dusts. Said sulfonamide is generally useful in retarding fungus growth on plants, fruits, seeds, soils, furs, leather, cotton wood and organic material in general. It may be applied directly to the organic material which is to be protected from fungi, but because the present amide is effective in extremely dilute concentrations, e. g., at a concentration of from, say, 0.001% to 1.0%, it is preferred to incorporate it with an inert carrier or diluent. The present sulfonamide is also useful as an agricultural insecticide and is particularly effective against insect pest larvae, in which application its efficiency is again demonstrated at concentrations which may be as low as 0.001%.

The invention is further illustrated, but not limited by the following examples:

Example 1

A mixture consisting of 10 g. (0.079) mole of ethylenesulfonyl chloride and 21.6 g. (0.079) mole of hexachlorocylcopentadiene was placed in a jacketed reactor containing bromobenzene in the outer jacket. The reaction mixture was heated by refluxing (ca 150° C.) the bromobenzene for three hours, at the end of which time the original mixture of ethylenesulfonyl chloride and diene had been converted into a dark brown liquid which thickened considerably upon cooling. Trituration and further cooling gave a semi-solid. This was treated with 20 ml. of hexane and warmed to effect solution. Upon cooling (ice-water) crystallization occurred. Filtration and drying of the precipitate gave 13.6 g. of tan, crystalline 1,2,3,4,7,7-hexachlorobicyclo[2,2,1]-2-heptene-6-sulfonyl chloride, M. P. 55–57° C. Evaporation and cooling of the filtrate gave a second crop of crystals (5.1 g.), M. P. 42–52° C. The combined crops were purified by twice recrystallizing from hexane to yield 16.3 g. (51.7% theoretical yield) of the substantially pure 1,2,3,4,7,7-hexachlorobicyclo[2,2,1]-2-heptene-6 sulfonyl chloride, M. P. 56–58° C. and analyzing as follows:

|   | Found | Calcd. For $C_7H_3Cl_7O_2S$ |
|---|---|---|
| Percent C | 21.33 | 21.05 |
| Percent H | 1.16 | 0.76 |
| Percent Cl | 61.66 | 62.15 |

Example 2

A mixture consisting of 32.6 g. (0.258 mole) of ethylene-sulfonyl chloride and 70.3 g. (0.258 mole) of hexachlorocyclopentadiene was heated for 4 hours at 155° C. The very dark reaction mixture was taken up with 40 ml. of hexane and the crystals which deposited in the resulting solution were washed with hexane and dried to give 63.2 g. of 1,2,3,4,7,7-hexachlorobicyclo[2,2,1]-2-heptene-6-sulfonyl chloride, M. P. 54–55° C. Evaporation and cooling of the filtrate gave a 12.1 g. of a second crop of said crystals, M. P. 48–52° C. Twice repeated crystallization of the combined crops gave 60.9 g. of the substantially pure 1,2,3,4,7,7-hexachlorobicyclo[2,2,1]-2-heptene-6-sulfonyl chloride, M. P. 55.5–57° C.

Example 3

1,2,3,4,7,7-hexachlorobicyclo[2,2,1]-2-heptene-6-sulfonyl chloride was converted to the sodium sulfonate as follows:

Into a 500 ml. flask equipped with stirrer, thermometer and reflux condenser there were placed 15 g. (0.0376 mole) of said chloride, 50 ml. each of water and methanol and 4.0 g. (0.0376 mole) of sodium carbonate. The resulting mixture was heated, with stirring, for one hour at 60° C. and then refluxed (76° C. to 85° C.) for about 18 hours. The reaction mixture was evaporated to dryness and the dried product was twice extracted with two 75 ml. portions of absolute ethanol. Upon treating the combined extracts first with benzene and then hexane in order to remove any material insoluble therein (none precipitated) the resulting solution was evaporated to remove all the solvents. There was thus obtained as residue a very thick oil which rapdily solidified upon the addition of a drop of water. The solidified mass was then dissolved in 50 ml. of water and the solution allowed to cool. The product which separated out was recrystallized from 50 ml. of hot water and then dried for 2 hours at 100° C./1.0 mm. to give the substantially pure sodium 1,2,3,4,7,7-hexachlorobicyclo[2,2,1]-2-heptene-6-sulfonate which analyzed as follows:

|   | Found | Calcd. For $C_7H_3Cl_6NaO_3S$ |
|---|---|---|
| Percent C | 19.81 | 20.87 |
| Percent Cl | 51.69 | 52.81 |

The sodium sulfonate was found to be extremely soluble in ethanol, acetone and hexane. Although insoluble in dry benzene, it dissolved readily in benzene containing traces of moisture.

Example 4

Wheat seedlings were sprayed to run-off with an 0.5% aqueous solution of sodium 1,2,3,4,7,7-hexachlorobicyclo[2,2,1]-2-heptene-6-sulfonate of Example 3, and the sprayed plants were maintained for 5 days on the greenhouse bench under ordinary conditions of sunlight and watering. Observation of the plants at the end of that time showed them to have been severely injured.

Example 5

This example describes the preparation of 1,2,3,4,7,7-hexachlorobicyclo[2,2,1]-2-heptene-6-sulfonamide.

To 20–25 ml. of liquid ammonia there was gradually added, with stirring and while cooling with an acetone-Dry Ice bath 15 g. (0.0376 mole) of 1,2,3,4,7,7-hexachlorobicyclo[2,2,1]-2-heptene-6-sulfonyl chloride. The addition required 15 minutes and after all of the chloride had been introduced, stirring at a temperature of minus 70° C. was continued for another 15 minutes. The cooling bath was then removed, and the reaction mixture was allowed to stand for approximately one hour. At the end of that time all of the ammonia apparently had been consumed or evaporated. The reaction product was then dissolved in about 150 ml. of a 2 percent aqueous solution of sodium hydroxide, filtered and the filtrate treated with 10 percent aqueous hydrochloric acid. The solid which was thereupon precipitated was collected, washed with water and dried overnight, thus yielding 14.0 g. of the crude sulfonamide, M. P. 194–196° C. It was purified by dissolving it in water-ethanol mixture, boiling the solution with charcoal and Hy-Flo (a filter aid), filtering and drying the precipitate. The dried product thus obtained (12.6 g.) was the substantially pure 1,2,3,4,7,7 - hexachlorobicyclo[2,2,1] - 2-heptene-6-sulfonamide, M. P. 201–203° C. An analytical specimen, recrystallized from benzene, had M. P. 200.5°–202° C. and analyzed as follows:

|  | Found | Calcd. For $C_7H_5Cl_6NO_2S$ |
| --- | --- | --- |
| Percent C | 22.24 | 22.13 |
| Percent H | 1.84 | 1.33 |
| Percent Cl | 55.89 | 56.00 |

Example 6

The 1,2,3,4,7,7 - hexachlorobicyclo[2,2,1] - 2 - heptene-6-sulfonamide of Example 5 was evaluated as a systemic fungicide against the tomato wilt organism, *Fusarium oxysporum* f. *lycopersici*. The following procedure was employed:

Three 2-week old "Bonny Best" tomato seedlings were immersed in an ethanol-water solution containing 100 p. p. m. of said sulfonamide. After 48 hours the seedlings were removed and the root systems were rinsed thoroughly in tap water to remove any chemical residue. Approximately one-third of each lateral root system of each plant was severed and the wounded roots were dipped for 30 seconds in an aqueous suspension of the Fusarium bud-cells. The thus inoculated plants were immediately potted in steamed soil. Controls were prepared by similarly inoculating three 2-week old "Bonny Best" tomato seedlings which had not been treated with a chemical. Disease incidence was ascertained when the untreated, inoculated plants (controls) had been killed by the fungus. At that time the stems of the plants were cross-sectioned and examined for vascular browning. Those of the plants which had been treated with the present sulfonamide showed no vascular discoloration and no evidence of phytotoxicity effect.

Example 7

This example describes evaluation of the 1,2,3,4,7,7-hexachlorobicyclo[2,2,1]-2-heptene-6-sulfonamide of Example 5 against aquatic larvae. The following procedure was used:

Into an 18 x 65 mm. shell vial there were transferred 25 larvae of the yellow fever mosquito, *Aedes aegypti* (Linne'), in a minimum of rearing water by means of a larval transfer pipette. The vial of larvae was then poured into a 100 ml. graduate and water was added to the 100 ml. mark. A test dish was prepared by pipetting 0.1 ml. of a 1% acetone solution of said sulfonamide into a crystallizing dish, and then rapidly pouring the contents of the graduate into the dish. This gave an 0.001% (10 p. p. m.) concentration of said amide. The dish was then covered and allowed to stand on the laboratory bench for 24 hours. Observation at the end of that time showed a 100% kill of the larvae.

Solutions of the 1,2,3,4,7,7-hexachlorobicyclo[2,2,1]-2-heptene-6-sulfonamide in an organic solvent may be employed as fungicidal or insecticidal compositions. When used in sprays, the sulfonamide is preferably employed in an oil-in-water emulsion, whereby the sulfonamide is first dissolved in an organic solvent, e. g., acetone, and the resulting solution is added to water in the presence of an emulsifying agent or a dispersant, e. g., an alkali metal salt of a higher alkyl sulfosuccinate, an alkali metal salt of a higher alkylbenzenesulfonate, a polyalkylene glycol ether of a long chained alcohol, etc. Fungicidal or insecticidal dusts may be prepared by mixing the sulfonamide with an inert dusting material.

What I claim is:

1. A compound of the formula

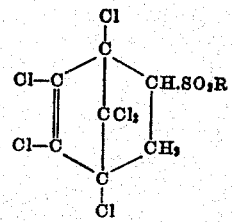

in which R is selected from the class consisting of halogen, —NH₂, —OH, and OM where M is alkali metal.

2. A 1,2,3,4,7,7-hexachlorobicyclo[2,2,1] - 2 - heptene-6-sulfonyl halide.

3. 1,2,3,4,7,7-hexachlorobicyclo[2,2,1] - 2 - heptene - 6-sulfonyl chloride.

4. 1,2,3,4,7,7-hexachlorobicyclo[2,2,1] - 2 - heptene - 6-sulfonamide.

5. 1,2,3,4,7,7-hexachlorobicyclo[2,2,1] - 2 - heptene - 6-sulfonic acid.

6. An alkali metal 1,2,3,4,7,7-hexachlorobicyclo[2,2,1]-2-heptene-6-sulfonate.

7. Sodium 1,2,3,4,7,7 - hexachlorobicyclo[2,2,1] - 2-heptene-6-sulfonate.

8. The method of inhibiting fungus growth which comprises exposing the fungi to a fungitoxic quantity of 1,2,3,4,7,7 - hexachlorobicyclo[2,2,1] - 2 - heptene - 6-sulfonamide.

9. The method of destroying insect pests which comprises contacting the pests with an insecticidal quantity of 1,2,3,4,7,7 - hexachlorobicyclo[2,2,1] - 2-heptene - 6-sulfonamide.

References Cited in the file of this patent

Snyder et al.; Journal American Chemical Society, vol. 73, pp. 3258–60 (1951).

Wygant: Dissertation, Unsaturated Sulfonic Acids, 1952, pp. 1A–3A, iv–vii, 1–14, 80, 81, 108, 109, 111, 112, 116–120 (32 pp.).

UNITED STATES PATENT OFFICE
CERTIFICATE OF CORRECTION

Patent No. 2,875,123            February 24, 1959

James C. Wygant

It is hereby certified that error appears in the printed specification of the above numbered patent requiring correction and that the said Letters Patent should read as corrected below.

Column 1, lines 48 to 52, the formula should appear as shown below instead of as in the patent:

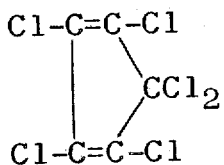

Signed and sealed this 3rd day of January 1961.

(SEAL)
Attest:

KARL H. AXLINE
Attesting Officer

ROBERT C. WATSON
Commissioner of Patents